(No Model.)

E. EVANS.
SHUT-OFF VALVE FOR OIL WELLS.

No. 530,405. Patented Dec. 4, 1894.

WITNESSES:

INVENTOR
Evan Evans
BY
Lehmann Patterson & Nesbit,
ATTORNEYS

UNITED STATES PATENT OFFICE.

EVAN EVANS, OF CHICORA, PENNSYLVANIA.

SHUT-OFF VALVE FOR OIL-WELLS.

SPECIFICATION forming part of Letters Patent No. 530,405, dated December 4, 1894.

Application filed November 14, 1893. Serial No. 490,921. (No model.)

*To all whom it may concern:*

Be it known that I, EVAN EVANS, of Chicora, in the county of Butler and State of Pennsylvania, have invented certain new and useful Improvements in Shut-Off Valves for Oil-Wells; and I do hereby declare the following to be a full, clear, and exact description of the invention, such as will enable others skilled in the art to which it pertains to make and use it, reference being had to the accompanying drawings, which form part of this specification.

My invention relates to shut-off valves for oil wells; and it consists in certain improvements to the valve shown in Patent No. 469,996, granted me March 1, 1892, which will be fully described and claimed hereinafter.

The object of my invention is to so construct the valve that it may be readily removed from the working barrel without displacing the latter, and a further object of my invention is to so construct the valve spring as to avoid its interference with the valve stem.

Figure 1:
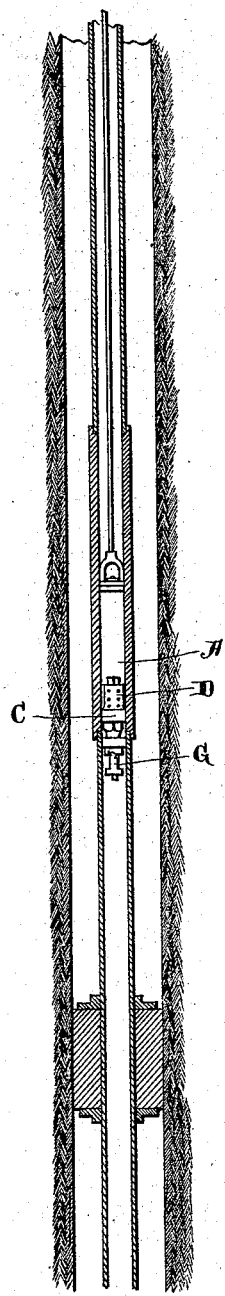
Figure 2:
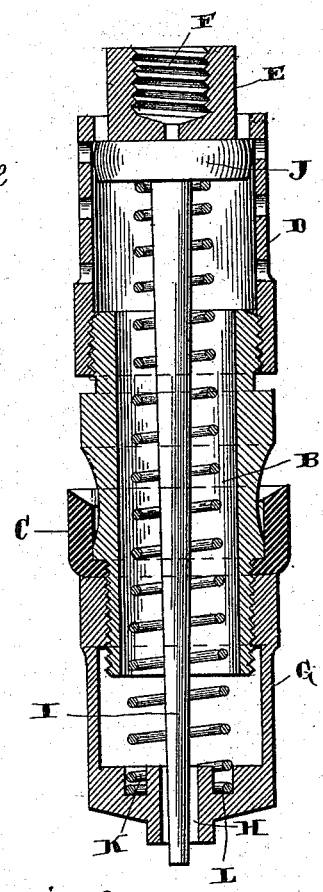
Figure 3:
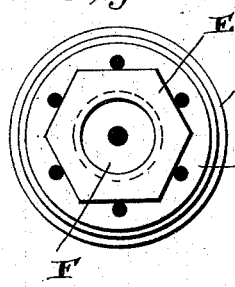
Figure 4:
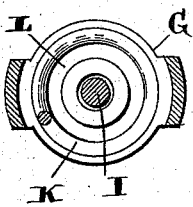

In the accompanying drawings,—Figure 1 is a vertical sectional view of a portion of an oil well showing my improved valve in position. Fig. 2 is a vertical sectional view of the valve. Fig. 3 is a plan view. Fig. 4 is a cross sectional view of the yoke.

A is the working barrel; B, the valve seat, and C the cup washer thereon which fits tightly the barrel. Removably secured to the upper end of the valve seat is the perforated chamber or shell D, having upon its outer upper end the hexagonal wrench hold or angular boss E formed with a vertical screw threaded recess F. Thus it will be seen the said shell may be readily applied to and removed from the valve seat, while the screw threaded cavity affords a hold for the lower screw threaded end of a rod (not shown) for elevating and removing the valve from its position in the working barrel.

Removably secured to the lower end of valve seat B is yoke G recessed longitudinally at H through which stem I is adapted to move, having upon its upper end valve J. This valve is held normally in a raised position within shell D by spiral spring K which rests at its lower end in depression L of yoke G as shown in Fig. 4. The spring is thus held in position so as not to interfere with stem I, while its tapered upper end fits tightly the stem beneath the valve. The upper end of the valve seat is squared so that the flat valve rests squarely thereon.

The operation will be apparent to any one skilled in the art to which the invention relates. The valve is inactive so long as the traveling valve is in operation but immediately upon its cessation the weight of the liquid in the working barrel depresses valve J and prevents the backward flow of the same.

Having thus fully described my invention, what I claim as new, and desire to secure by Letters Patent, is—

As a new article of manufacture the shut off valve shown and described composed of the integral cylindrical perforated chamber D, on its upper end having the boss E, with the threaded socket in its top, the valve seat in the lower end of the chamber, the yoke G depending from said seat and in the upper side of its lower end having the annular groove, the valve in the chamber having the depending stem, and the tapered spring around the stem, having its small upper end bearing against the valve and its lower end fitted in said groove.

In testimony whereof I affix my signature in presence of two witnesses.

EVAN EVANS.

Witnesses:
J. C. WIDGER,
W. M. AGGERS.